United States Patent
Cohen (10) Patent No.: US 7,008,679 B2
(45) Date of Patent: Mar. 7, 2006

(54) SHELL ARTICLE CONSTRUCTION

(76) Inventor: Wayne Cohen, 44 Convent Road, Silom, Bangrak (TH), 10500

( * ) Notice: Subject to any disclaimer, the term of this patent is extended or adjusted under 35 U.S.C. 154(b) by 394 days.

(21) Appl. No.: 10/021,813

(22) Filed: Dec. 14, 2001

(65) Prior Publication Data

US 2002/0076513 A1 Jun. 20, 2002

Related U.S. Application Data (60) Provisional application No. 60/255,643, filed on Dec. 14, 2000.

(51) Int. Cl.
*B29D 22/00* (2006.01)
*B29D 23/00* (2006.01)
*B32B 1/08* (2006.01)
*G09F 17/00* (2006.01)
*G09F 19/00* (2006.01)

(52) U.S. Cl. ............... 428/36.9; 428/11; 428/35.7; 428/34.1; 428/66.5; 428/66.3; 428/66.7

(58) Field of Classification Search ............ 428/11, 428/35.7, 36.9, 36.91, 36.92, 34.1, 35.2, 428/66.5, 66.3, 66.7; 84/402; 220/680, 240, 220/378, 80, 3, 5 A, 315, 316, 319
See application file for complete search history.

(56) References Cited

U.S. PATENT DOCUMENTS

| 4,212,460 A | * | 7/1980 | Kraft ..................... 273/58 |
| 4,219,125 A | * | 8/1980 | Wiltshire et al. ........ 220/5 |
| 4,224,364 A | * | 9/1980 | Hunt ...................... 428/11 |
| 4,311,623 A | | 1/1982 | Supcoe .................. 260/18 |
| 4,936,483 A | * | 6/1990 | Ballu ..................... 220/240 |
| 5,158,203 A | | 10/1992 | Coffin .................... 220/680 |
| 5,808,215 A | | 9/1998 | Kralik et al. ........... 84/402 |

* cited by examiner

*Primary Examiner*—Harold Pyon
*Assistant Examiner*—Michael C. Miggins
(74) *Attorney, Agent, or Firm*—Baker Botts LLP (57) ABSTRACT

A shell article is fabricated in three parts having different colors. The first and second parts are end parts and include edges for mating with each other or an intermediate part. The intermediate part is arranged between the two end parts. Each of the parts is molded out of plastic in contrasting colors.

16 Claims, 8 Drawing Sheets

SHELL ARTICLE CONSTRUCTION

This application claims the benefit of Provisional Application No. 60/255,643, filed Dec. 14, 2000.

BACKGROUND OF THE INVENTION

The present inventor has originated designs which may be used in connection with decorative maracas, key chain, fobs, pens, Christmas ornaments and drink mixers. The present invention is directed at means for mechanically fabricating such articles.

In my prior U.S. Pat. No. 5,808,215 there is described a hollow musical instrument in the shape of an egg which is preferably fabricated by blow molding. As described in that patent, there have been known prior techniques for fabricating hollow shell structures using injection molded parts that are joined at a plane corresponding to the largest circumference of the shell.

It is an object of the present invention to provide a technique for fabricating hollow plastic shells which have decorative color schemes.

SUMMARY OF THE INVENTION

In accordance with the invention there is provided a hollow shell article having at least two colors and formed of three or more joined molded plastic parts. A first end part has accessible internal and external partial shell surfaces. The first part has a first mating edge structure. A second end part is provided having accessible internal and external shell surfaces. The second part has a second mating edge structure. A third intermediate part is provided having an external shell surface and a cylindrical internal surface. The third part includes third and fourth mating edges arranged to engage the first and second mating edges respectively.

In one preferred arrangement one of the first and third mating edges has an external ledge, and the other of the first and third edges has an internal ledge. The ledges may be formed of a cylindrical surface and a perpendicular surface, which may be non-planar. In another arrangement one of the first and third mating edges is a ridge and the other of the first and third mating edges is a groove. The ridges and grooves may be defined by two cylindrical surfaces and a perpendicular surface, which may be non-planar.

According to the invention there is provided a hollow shell article having a first end part having an end shall portion having an edge. A tubular extension projects from the edge of the first end part. An intermediate part surrounds the tubular extension. A second end part includes a second end shell portion having an edge with an interior mating structure for receiving the tubular extension.

In a preferred arrangement the intermediate part includes a bore closely surrounding the tubular extension. The intermediate part may be fabricated in a different color from the first end part. Two or more intermediate parts may be provided, and at least a portion of one of the intermediate parts may overlie a portion of the other intermediate part. The tubular extension may be provided with ridges and the intermediate part may have a central bore with an internal projection for engaging the ridges.

For a better understanding of the present invention, together with other and further objects, reference is made to the following description, taken in conjunction with the accompanying drawings, and its scope will be pointed out in the appended claims.

DESCRIPTION OF THE INVENTION

Figures 1, 2, 3:
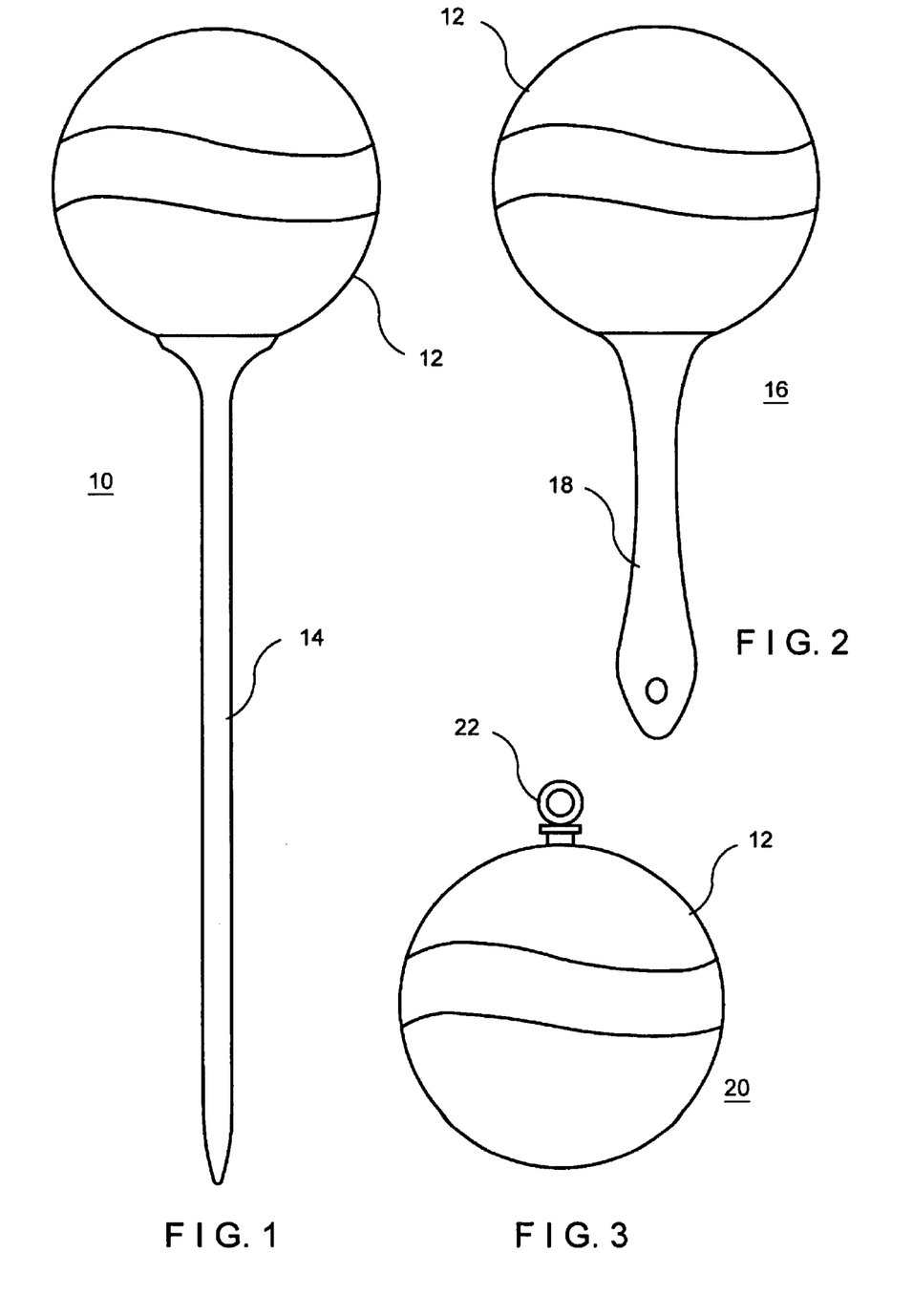
FIG. 1 is a plane elevation view of a cocktail stirrer having a shell article fabricated in accordance with the present invention.
FIG. 2 is plane elevation view of a maraca having a shell article fabricated in accordance with the present invention.
FIG. 3 is a plane elevation view of a key chain fob or an ornament having a shell article fabricated in accordance with the present invention.

FIGS. 1–3 show examples of articles fabricated using a plastic multi-colored shell article according to the present invention. FIG. 1 illustrates a cocktail stirrer 10 having an hollow spheroid multi-colored shell article 12 attached to a handle 14. FIG. 2 shows a maraca or child's rattle 16 having a spheroid article 12 attached to a handle 18. FIG. 3 shows a key chain fob or Christmas tree ornament 20 having a spheroid article 12 and an attachment ring 22.

The inventor has designed these and other novelty items using a shell article 12 which is multi-colored and intended to evoke recollections of a soft drink logo, a flag, or other familiar items. In connection with fabricating such shell articles, it is difficult to print or paint the multi-colored design on to a solid or two-piece plastic shell article, such as a blow molded egg or sphere, or a spheroid shell fabricated from two injection molded parts which are joined along a plane of maximum circumference or symmetry. The inventor has recognized that the most desirable appearance of the items can be realized when the shell article 12 is fabricated of three or more separate parts, each being fabricated of a color plastic having a selected color.

Figure 4:
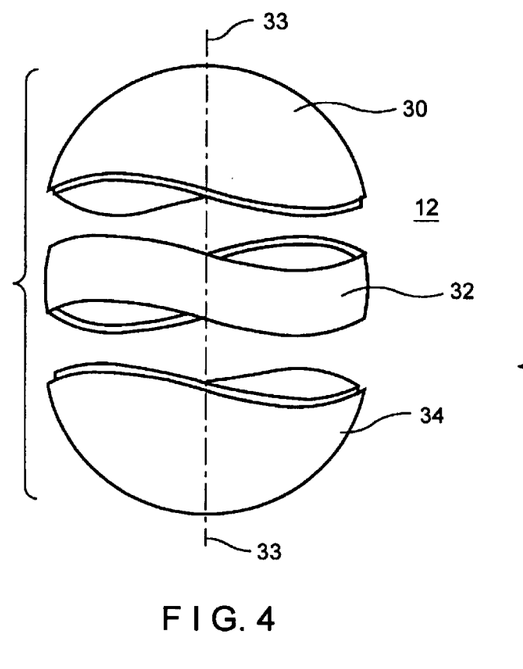
FIG. 4 is an exploded elevation plane view of a first embodiment of a shell article according to the present invention.
Figure 5:
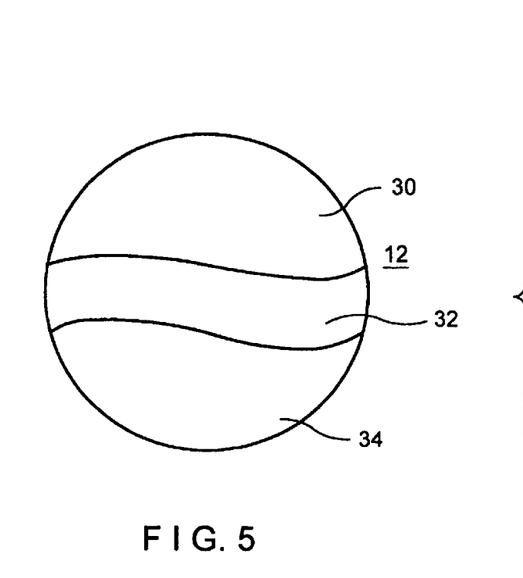
FIG. 5 is an elevation plane view of the article of FIG. 4 in an assembled condition.

FIG. 4 is an exploded view of a three-part fabrication of a first embodiment of the present invention. The shell article 12 is fabricated from a first partial spheroid end part 30, a second partial spheroid end part 34 and an intermediate part 32. In the preferred arrangement part 30 is red, part 32 is white and part 34 is blue. The parts are brought into junction with each other along an axis 33. FIG. 5 is an elevation plane view of the assembled spheroid article. It will be recognized by those skilled in the art that variations, such as attachment holes and the like may be made to the spheroid article of FIG. 5 in order to fabricate the articles of FIGS. 1, 2 and 3.

The article of FIGS. 4 and 5 is spherical, but those skilled in the art will recognize that following the invention the article may have a variety of shell shapes in addition to spherical, as will be described.

First end part 30 of article 12 has interior and exterior shell surfaces and has a first lower edge which is arranged to mate with the adjoining edge of intermediate part 32. Since the internal and external surfaces of part 30 are spheroid, and part 30 consists of less than half a sphere, the part 30 may be formed by injection molding in a process where mold halves can separate from each other by moving in a direction corresponding to axis 33. The characteristic of the interior and exterior surfaces to be separated from a mold along one or more axes is referred to herein as "accessible". Second end part 34 is likewise fabricated and has accessible interior and exterior surfaces and a second upper mating edge. Intermediate part 32 includes a spheroid external surface and an internal surface which is cylindrical thereby to enable the part to be separated from a mold cavity by moving cavity halves in the direction of axis 33. Intermediate part 32 has a third upper mating edge arranged to mate with the first edge of part 30 and a fourth lower mating edge arranged to mate with the second edge of part 34. The article 12 of FIG. 5 is preferably fabricated by applying adhesive to one edge of each pair of mating parts and joining the parts together.

Figure 4A:
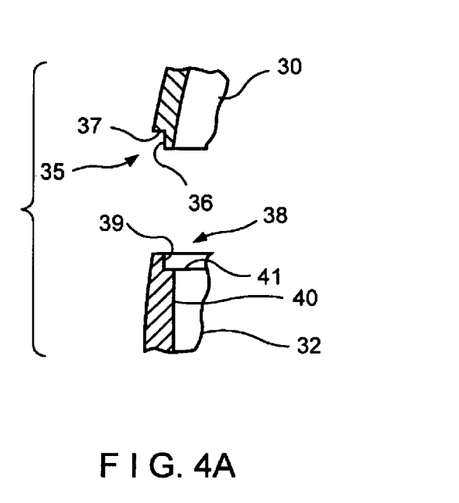
FIG. 4A is a detailed cross-section view of the edges of part of the article of FIG. 4.

Referring to FIG. 4A there is shown a detailed cross-sectional view of one arrangement for interconnections of the first edge of end part 30 and third edge of intermediate part 32. The first lower edge of part 30 includes a ledge 35 formed on the exterior surface and having a cylindrical surface 36 which intersects a perpendicular surface 37. It will be recognized that surface 37 is not necessarily planar, and in the embodiment of FIG. 4 follows the curve of the part edges and is therefore non-planar. Exterior ledge 35 on part 30 mates with interior ledge 38 on the third edge of intermediate part 32. Interior ledge 38 is formed by cylindrical surface 39 and perpendicular surface 41, which corresponds in shape to surface 37 and in the preferred embodiment of FIG. 4 is non-planar. As mentioned, the interior surface 40 of intermediate part 32 is substantially cylindrical or slightly conical to facilitate separation from an injection mold. Those skilled in the art will recognize that it is alternatively possible for the exterior ledge 35 to be provided on part 32 while the interior ledge 38 can be provided on part 30. The second edge of end part 34 which mates with the lower fourth edge of intermediate part 32 can be similarly formed.

Figure 4B:
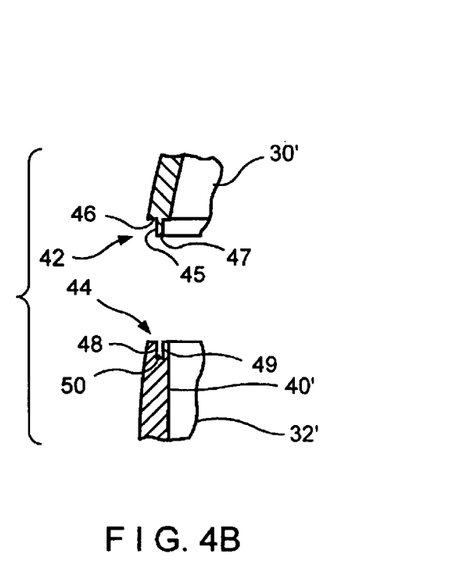
FIG. 4B is a detailed cross-sectional view of an alternate embodiment of the edges of the parts of the article of FIG. 4.

FIG. 4B shows an alternate construction for the mating edges of the parts of article 12. As shown in FIG. 4B the first lower edge of end part 30' has an extending ridge 42 having an exterior cylindrical surface 45 and an interior cylindrical surface 47. Surface 45 intersects a perpendicular surface 46. The bottom of the ridge 42 is preferably perpendicular to surfaces 45 and 47 and may be a non-planar surface in connection with the preferred embodiment of FIG. 4. Ridge 45 is arranged to be received in groove 44 on the upper third edge of intermediate part 32'. Part 32' includes an interior surface 40' which is substantially cylindrical in shape. Groove 44 includes cylindrical concentric opposed groove surfaces 48 and 49 and a bottom surface 50, which is preferably perpendicular to surfaces 48 and 49. The upper second edge of end part 34 and lower fourth edge of intermediate part 32 may be similarly formed. The ridges and grooves may be oppositely arranged on the mating edges.

Figure 6:
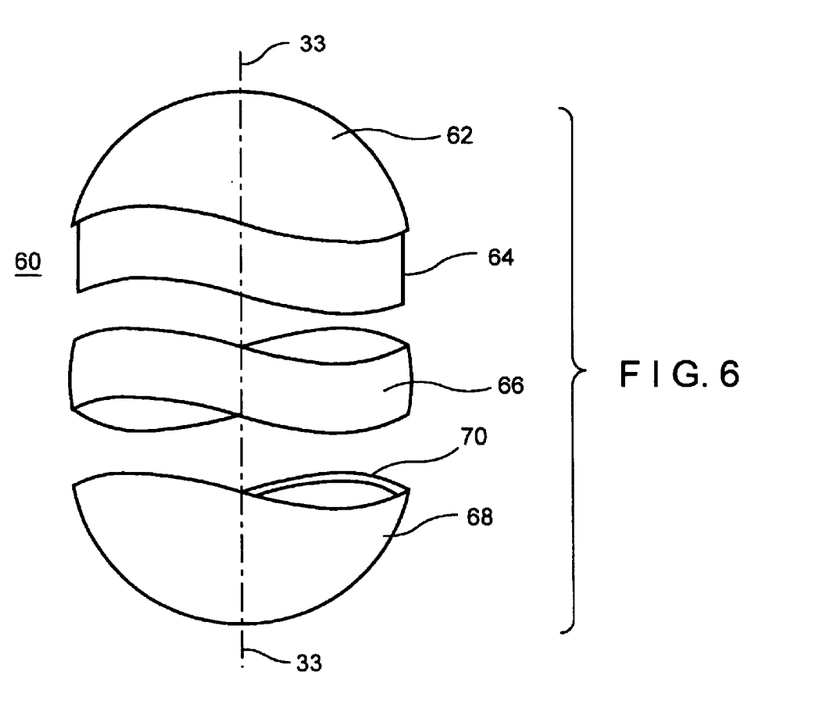
FIG. 6 is a exploded elevation plan view of a second embodiment of a shall article according to the present invention.
Figure 7:
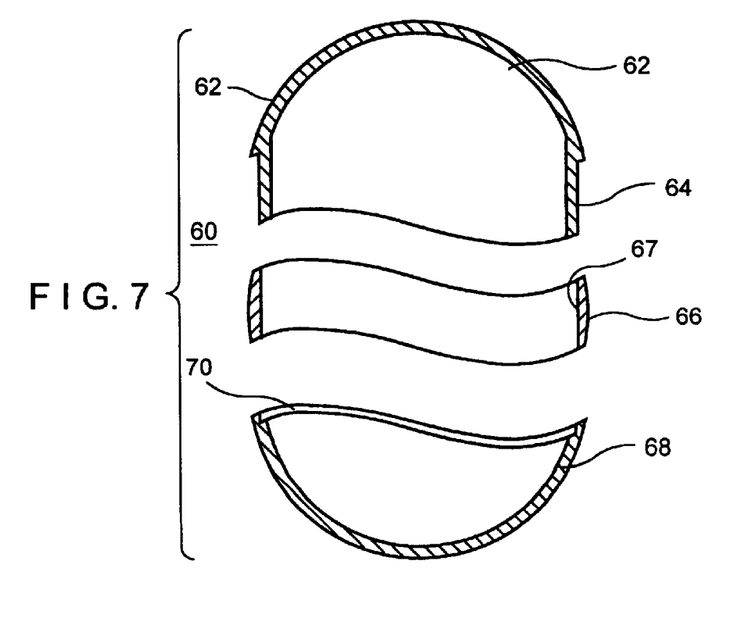
FIG. 7 is a cross-sectional view of the FIG. 6 article.

Referring to FIGS. 6 and 7 there is shown a second embodiment of the invention in an example having the same external appearance as the article 12 of FIG. 5. Article 60 includes a first end part 62, which includes a partial spherical shell portion and an extending tubular portion 64 which projects from the lower edge of the shell portion. The second end portion 68 has an interior ridge 70 which is designed to receive the lower end of tubular portion 64. Intermediate part 66 may have a plane cylindrical interior surface 67 which is sized to closely surround tubular portion 64. The axial length of tubular portion 64 is designed to correspond to the length of intermediate part 66 so that the lower end of tubular portion 64 is received in ridge 70.

Figure 8:
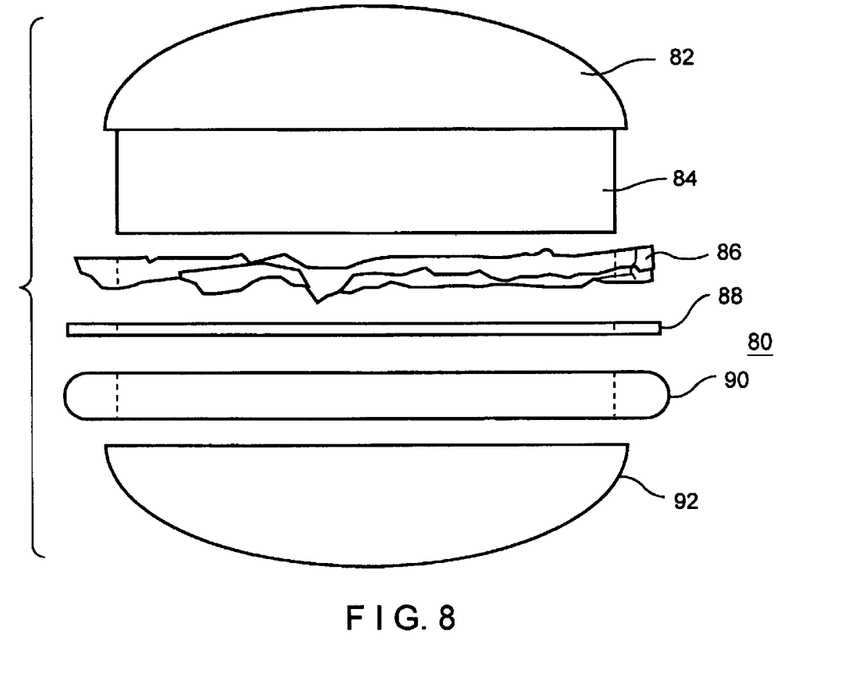
FIG. 8 is an exploded elevation plan view of a third embodiment of a shell article according to the present invention.
Figure 9:
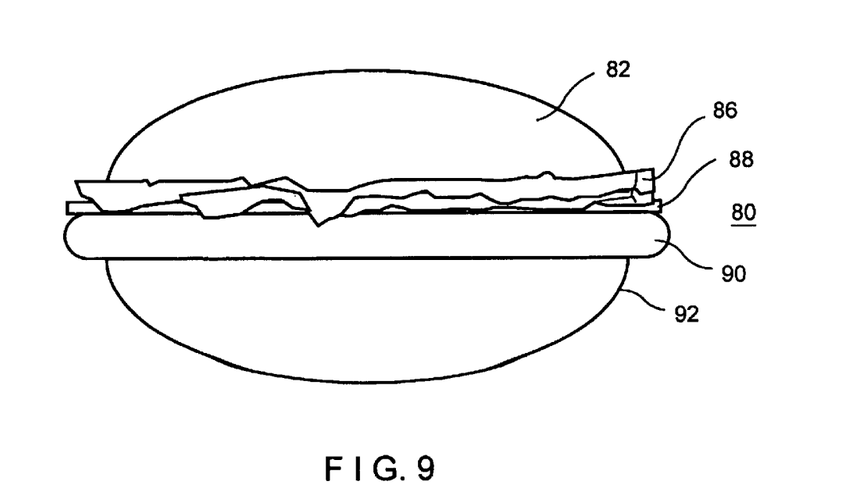
FIG. 9 is an assembled elevation plan view of the FIG. 8 article.

FIGS. 8 and 9 show respectively exploded and assembled elevation plan views of a shall article 80 which conveys the appearance of a burger with roll and toppings. The structure arrangement of article 80 are similar to those used in article 60 of FIGS. 6 and 7, except there are multiple intermediate parts in different colored plastic. Article 80 includes end part 82 with tubular extension 84, which may be cylindrical or other tubular shape. End part 92 includes an interior ridge arranged to receive the lower edge of tubular extension 84. End parts 82, 92 are molded of tan plastic to have the appearance of the top and bottom of a hamburger bun. Intermediate parts 86, 88 and 90 are respectively colored green (for lettuce), yellow (for cheese) and brown (for the hamburger patty). Each has a central bore which receives extension 84. The intermediate parts may optionally have mating edges. It should be noted that in the assembled form shown in FIG. 9 lettuce part 86 may optionally partially overlie parts of end part 82 and cheese part 88. Those skilled in the art will recognize that parts representing onion, tomatoes, etc. may be added.

Figures 10, 11, 11A, 11B:
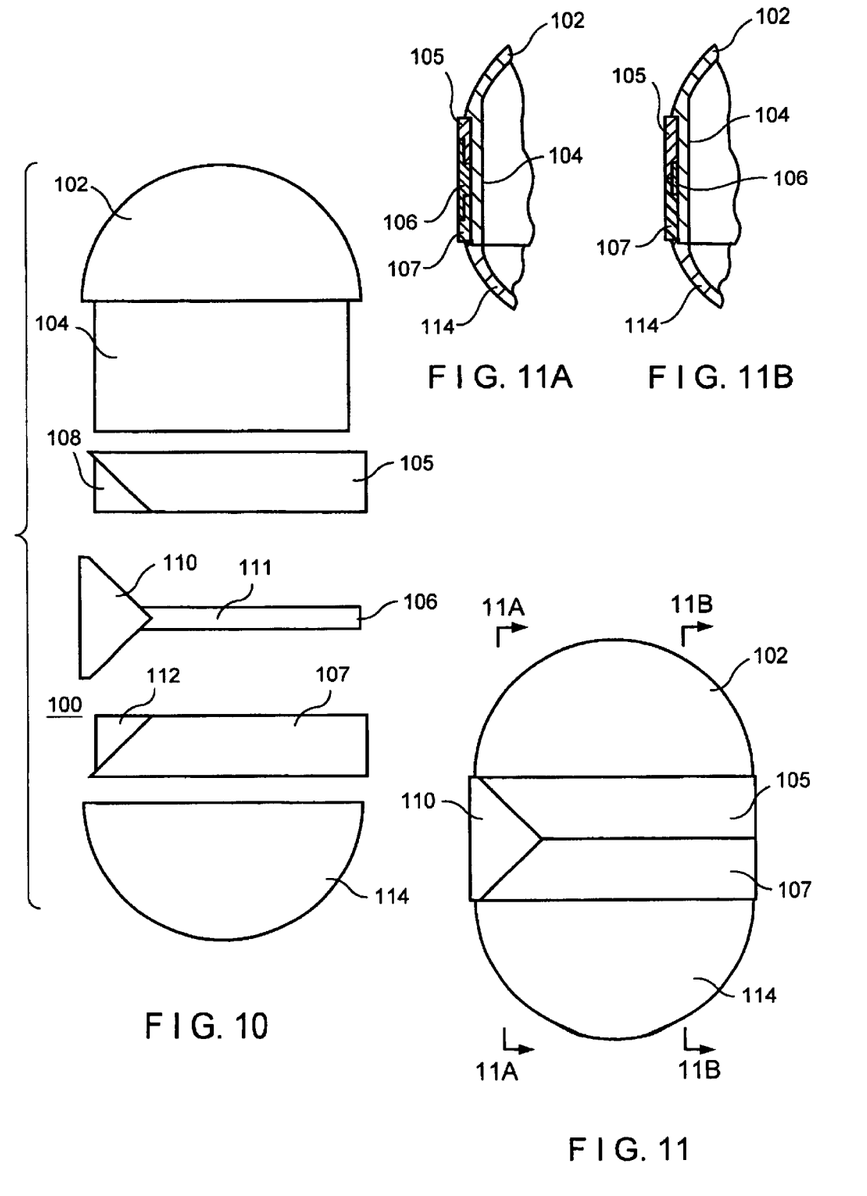
FIG. 10 is an exploded elevation plan view of a fourth embodiment of a shell article according to the present invention.
FIG. 11 is an assembled elevation plan view of the FIG. 10 article.
FIG. 11A is a partial cross-sectional view of the assembled FIG. 10 article taken along a radial plane at lines A—A of FIG. 11.
FIG. 11B is a detailed cross-sectional view of the assembled FIG. 10 article taken along a radial plane at lines B—B of FIG. 11.

FIGS. 10 and 11 show arrangements wherein color patterns which do not fully surround the article may be provided. Article 106 is an ovoid shell article having a central flag around the circumference. End part 102 has a tubular extension 104 which receives three optionally colored intermediate parts 105, 106 and 107. Parts 105 and 107 have a triangular recess 108, 112 over which triangular projecting portion 110 of intermediate part 106 overlies in the assembled condition, as shown in the cross-sectional views of FIGS. 11A and 11B. The resulting article, as shown in FIG. 11 exhibits a two or three color flag.

Figure 12:
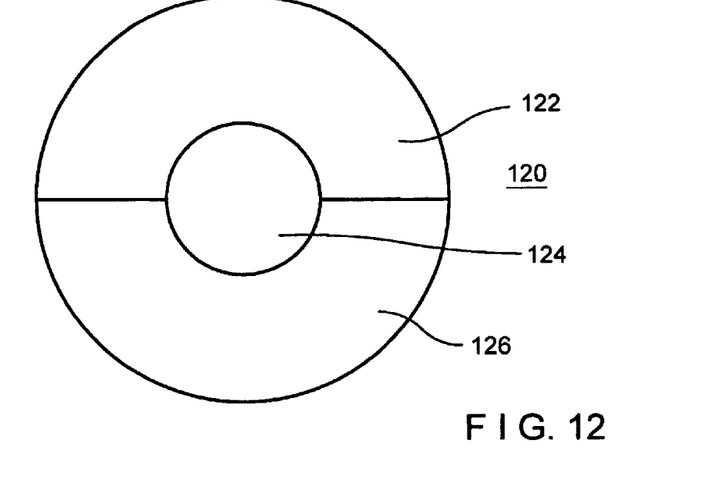
FIG. 12 is a plan elevation view of a fifth embodiment of a shell article according to the invention.
Figure 13:
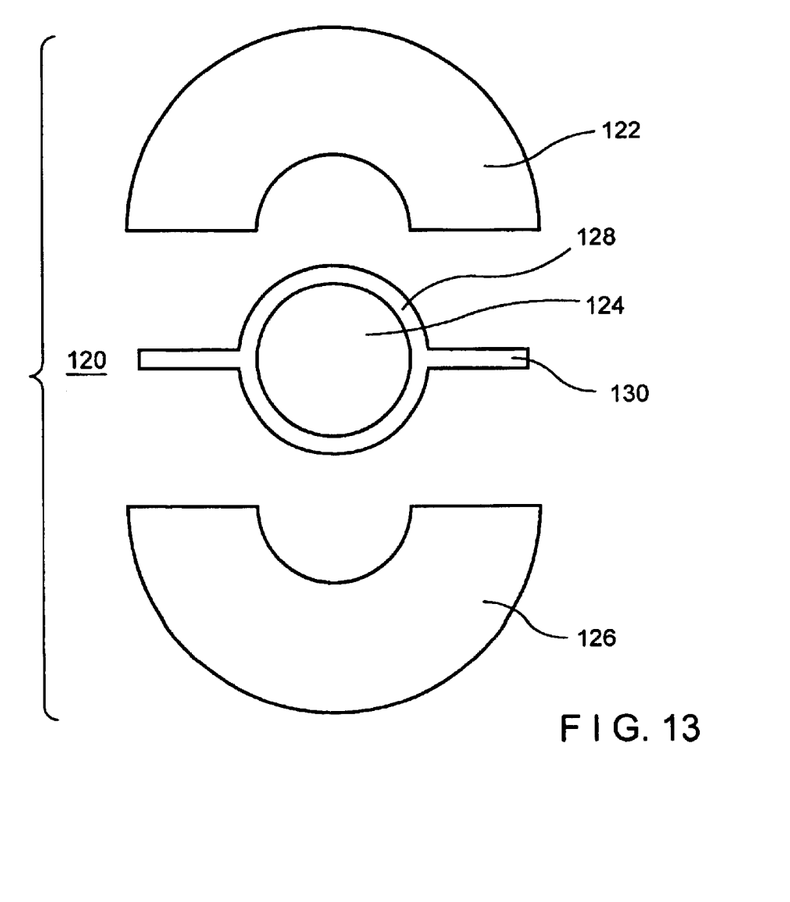
FIG. 13 is an exploded view of the FIG. 12 article.

FIGS. 12 and 13 show respectively a spherical article 120 with a separately colored circle 124 surrounded by contrasting color end parts 122, 126. Intermediate part 124 is formed with recessed portions 128 and 130, which are received into internal ledges on end parts 122, 126, so that only the central circle is seen in the assembled article.

FIGS. 14 to 18 illustrate a shell article 140 according to the invention made to appear as a hamburger, and arranged to be mounted on a handle to form a maraca. The shell article 140 additionally forms a cabasa as will be described.

Figure 14:
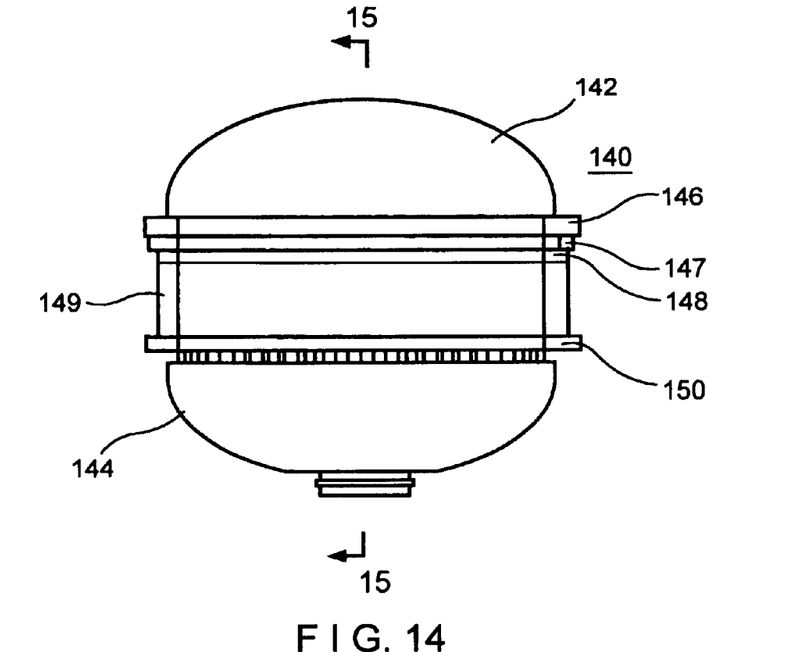
FIG. 14 is an elevation plan view of a sixth embodiment of a shell article according to the invention.
Figure 15:
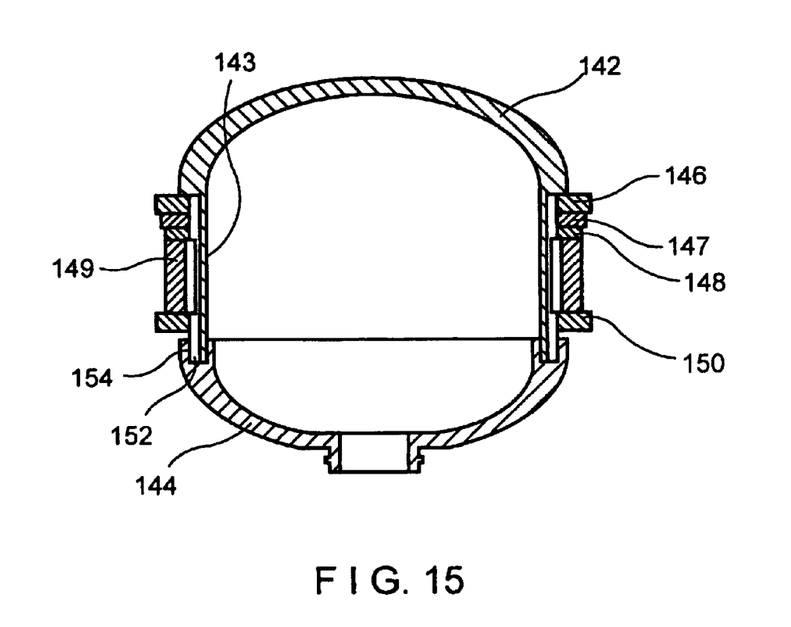
FIG. 15 is a cross-sectional view of the FIG. 14 article.

Article 140 includes a top part 142 having the external appearance of a bun top and having a tubular extension 143. End 152 of the tubular extension 143 is received in a groove 154 around the upper edge of bottom member 144, which has the appearance of the lower part of a hamburger bun. Intermediate parts 146, 147, 148, 149 and 150 surround tubular extension 143 and have the external appearance of a hamburger patty, lettuce, tomato, cheese, sauce, etc.

Figure 16:
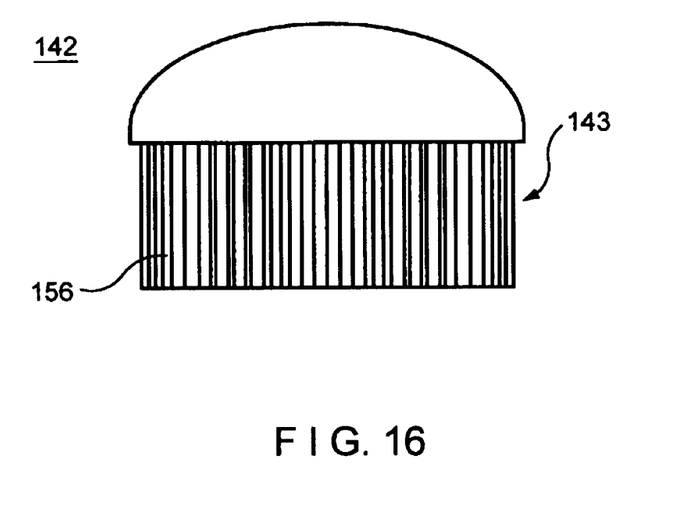
FIG. 16 is a plan elevation view of the top part of the FIG. 14 article.
Figure 17:
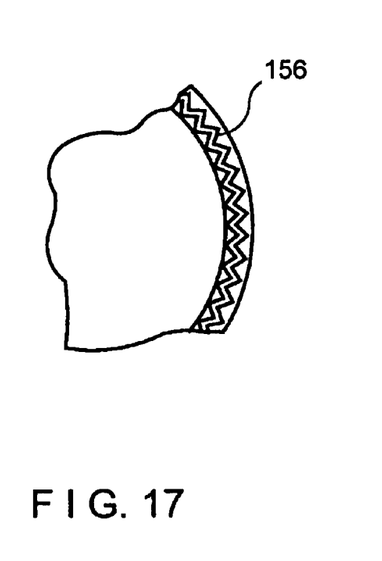
FIG. 17 is a detailed partial end view of the FIG. 16 top member.
Figure 18:
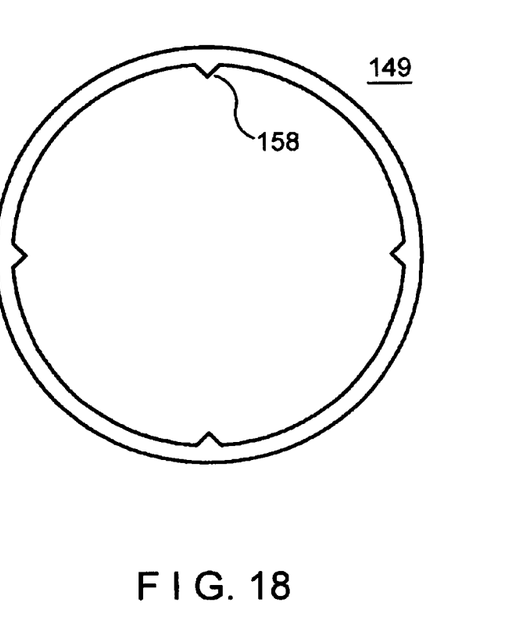
FIG. 18 is a top view of an intermediate part of the FIG. 14 article.

The tubular extension 143 is provided with longitudinal ridges 156, as shown in FIGS. 16 and 17. At least one of the intermediate parts 149 has a central bore with at least one projection 158 extending into the central bore. In a preferred assembly arrangement tubular extension 143 is glued into groove 154 after the intermediate parts are received thereon. The intermediate parts thereby are free to turn about tubular extension 143 independently or optionally together. Projection 158 provided on at least one intermediate part is sized to interfere slightly with longitudinal ridges 156, thereby producing a cabasa type sound when rotated. This feature can be in addition to providing pellets inside shell 140 providing a maraca sound.

While there have been described what are believed to be the preferred embodiments of the present invention, those skilled in the art will recognize that other changes and modifications may be made thereto without departing from the spirit of the invention, and it is intended to claim all such changes and modifications as fall within the true scope of the invention.

I claim:

1. A hollow shell article formed of three joined molded plastic parts, comprising
   a first end part having an accessible first external partial shell surfaces, said first end part having a first mating edge structure,
   a second end part having an accessible second external partial shell surfaces said second part having a second mating edge structure, and
   a third intermediate part having an external surface with a predetermined width, wherein said third intermediate part includes a selected decorative shape designed for viewing by a viewer, which extends for a predetermined width and extending for a predetermined distance between the first and second mating edge structures said third part including third and fourth mating edges arranged to engage said first and second mating edges respectively, wherein at least a portion of the intermediate part including the decorative shape is coextensive with the first edge mating structure, and wherein at least a portion of the intermediate part including the decorative shape is coextensive with the second edge mating structure.

2. A hollow shell article as specified in claim 1 wherein at least a portion of one of said end parts overlies a portion of said intermediate part.

3. A hollow shell article as specified in claim 1 wherein said selected decorative shape has a shape of a wave.

4. A hollow shell article as specified in claim 1 wherein said first external partial shell surface includes a selected decorative shape.

5. A hollow shell article as specified in claim 1 wherein said second external partial shell surface includes a selected decorative shape.

6. An article as specified in claim 1 wherein one of said first and third mating edges comprises an external ledge and the other of said first and third edges comprises an internal ledge.

7. An article as specified in claim 6 wherein each of said ledges is formed of a cylindrical surface and a perpendicular surface.

8. An article as specified in claim 7 wherein said perpendicular surfaces are non-planar.

9. An article as specified in claim 1 wherein one of said first and third mating edges comprises a ridge and the other of said first and third mating edges comprises a groove.

10. An article as specified in claim 9 wherein each of said ridge and said groove are defined by two cylindrical surfaces and a perpendicular surface.

11. An article as specified in claim 10 wherein said perpendicular surfaces are non-planar.

12. A hollow shell article having an exterior surface comprising:
    at least one intermediate part including an exterior surface which has a decorative shape and an internal passage;
    a first end part including an end shell portion which has a shell edge and a tubular extension projecting from said shell edge, wherein a cross-section of said tubular extension is smaller than a cross-section of said decorative shape, the at least one intermediate part surrounding said tubular extension and said internal passage arranged to closely surround said tubular extension; and
    a second end part having a second end shell portion having an edge and an interior mating structure formed on said edge and receiving said tubular extension, said first and second end parts being configured for:
    (i) assembly with said intermediate part retained between said edges of said first and second end parts; and
    (ii) forming with said first and second end parts a combined structure having a decorative shape.

13. A hollow shell article as specified in claim 12 wherein said intermediate part includes a bore for closely surrounding said tubular extension.

14. A hollow shell article as specified in claim 12 wherein at least said first end part and said intermediate part are fabricated of different color plastic.

15. A hollow shell article as specified in claim 12 wherein there are provided two or more of said intermediate parts, and wherein at least a portion of one of said intermediate parts overlies a portion of another intermediate part.

16. A hollow shell article as specified in claim 12 wherein said tubular extension is provided with external ridges, and wherein said intermediate part has a central bore and at least one projection extending into said central bore.

* * * * *